Sept. 30, 1958     G. L. HOBROUGH     2,854,593

MAGNETOSTRICTION DEVICE AND METHOD

Filed April 6, 1955

INVENTOR
Gilbert L. Hobrough
By: J. Richard Cavanagh

United States Patent Office 2,854,593
Patented Sept. 30, 1958

2,854,593
MAGNETOSTRICTION DEVICE AND METHOD

Gilbert Louis Hobrough, Whitby, Ontario, Canada

Application April 6, 1955, Serial No. 499,736

8 Claims. (Cl. 310—26)

This invention relates to a magnetostriction device and to a method of converting mechanical energy to electrical energy.

It is the main object of the invention to provide a magnetostrictive element useful as a transducer for application in phonograph pickups, recording heads, electrical meters, measuring instruments and control devices, wherein a single efficient element of relatively small mass or inertia is desired for converting mechanical energy to electrical energy or the reverse.

It is another object of the invention to provide a single ended form of magnetostriction device.

It is a further object of the invention to provide a simplified method for converting mechanical energy to electrical energy.

Other objects of the invention will be appreciated by a study of the following specification taken in conjunction with the accompanying drawings.

Figure 1:
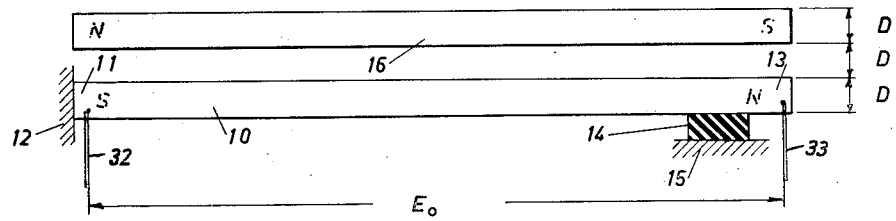
Figure 1 is a diagrammatic view of a single ended magnetostrictive device of the invention.

Referring to Figure 1, the magnetostrictive element 10 in the form of a wire or rod of substantially uniform cross-section is fixed at one end 11 to a suitable anchorage 12 illustrated diagrammatically, while the other end 13 is free to twist. The end 13 may be supported against gravity and free vibration by a soft rubber block 14 on base 13 or in any other suitable manner permitting free twisting of the element relative to anchorage 12 or fixed end 11. The arrangement may be referred to as a single ended construction.

In the single ended form of the invention shown in Figure 1, the element or rod 10 may be formed entirely of a magnetostrictive material such as a nickel cobalt alloy having a magnetic flux established therein. Upon twisting the end 13 of element 10 about the longitudinal axis thereof, the flux path between the magnetic poles thereof will be twisted helically to induce transient voltage $E_o$ longitudinally in the axially extending core region thereof.

It is believed that the core region of the element 10 acts as a conductor cut by magnetic lines of flux therein when the normally longitudinal path of the flux through the element is helically distorted by mechanically twisting the end 13. The permanent magnet 16 of high flux density but simple form is supported closely parallel to element 10 throughout its length but not in physical contact therewith.

Figure 2:
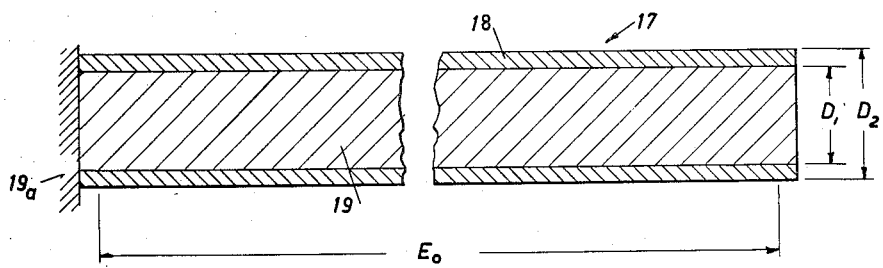
Figure 2 is a diagrammatic illustration of a preferred structure of magnetostrictive element of the invention.
Figures 3, 4:
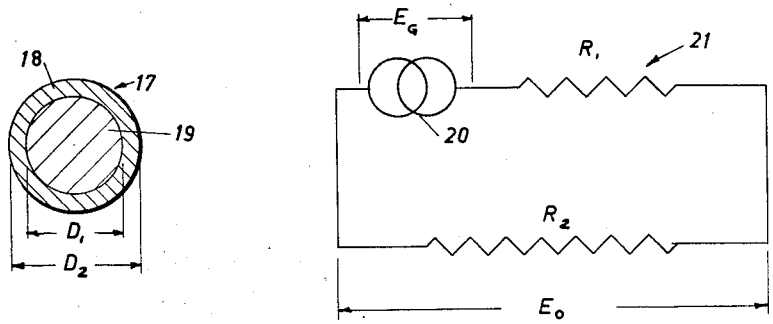
Figure 3 is a transverse sectional view of a preferred form of magnetostrictive element according to the invention.
Figure 4 shows the equivalent electrical circuit of the element of Figure 2.

A composite magnetostrictive element 17 is shown in Figures 2 and 3. The outer shell 18 is formed of a magnetostrictive material whereas the core portion 19 is formed of a material of low electrical resistance and preferably low magnetic permeability to concentrate the magnetic flux in the shell 18.

The magnetostrictive element is preferably formed by electroplating a magnetostrictive shell onto a copper wire. Nickel may be plated thereon by any well known plating method. It is preferred, however, that the shell have as high an electrical resistance as possible and good ductility while having good magnetostrictive properties. An alloy shell of nickel and cobalt may be plated on the wire from a Watts type plating solution containing the following:

| | Oz./gal. |
|---|---|
| Nickel sulphate | 35 |
| Nickel chloride | 6 |
| Boric acid | 5 |
| Cobalt sulphate | 0.4 |

An acid cleaned copper wire of 0.007 inch initial diameter and 6 inches long was electroplated in twelve ounces of the above solution at pH 4.0, temperature 130° F., 2.0 volts, and 300 amperes per square foot current density for 90 seconds while violently agitated. The plated wire had a diameter of 0.015 inch and presented a smooth ductile alloy coating. The wire was then annealed in hydrogen for two minutes. The thus formed composite magnetostrictive wire demonstrated an output about twenty decibles greater than that of a pure nickel wire of the same dimensions under the same test conditions. The increase in performance by the composite element can be explained by referring to Figures 3 and 4. The copper core or conductor 19 appears to act as a generator 20 in equivalent circuit 21 wherein $R_1$ is the resistance of core 10 and $R_2$ is the resistance of the sheath or shell 20.

It is submitted that the transient voltage $E_o$ measured across the ends of the composite element 20 is modified by the shunting effect of the shell on the core in an electroplated mutually conducting structure or in a solid nickel wire. Thus $$E_o = E_g \times \frac{R_2}{R_1 + R_2}$$

where $E_g$ is the transient output of the effective core which, in Figure 3, is the conductor 19. If the element is completely formed of nickel, then it appears that $$E_o = \frac{1 E_g}{3}$$

However, a composite magnetostrictive element formed as above set forth shows an effective transient voltage of about 0.9 $E_g$.

It can be shown that if the resistivity of the shell is high, or there is no metallic contact between the core and the shell, then the optimum ratio of the inner diameter $D_1$ to the outer diameter $D_2$ should be 1:2 as was the case with the six inch length of magnetostrictive wire used in comparative test.

It is to be noted that if the resistivity of the core is significant or of the same order as that of the shell, then the above noted ratio of diameters will tend toward unity.

Figure 5:
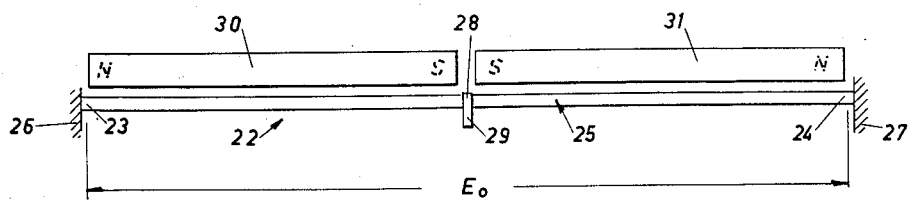
Figure 5 diagrammatically discloses a double ended construction of magnetostrictive device according to the invention.

The composite magnetostrictive element herein will also be useful in a double ended system 22 shown in Figure 5 wherein both ends 23 and 24 of the composite element 25 are anchored as at 26 and 27 and an intermediate point 28 in the element is twisted or caused to twist, by applying a force to the member 29 mounted thereon. The output of each section is additive to produce a total transient output $E_0$.

An external permanent magnet is not deemed essential for operativeness of most magnetostrictive rods or wires having residual or resident magnetism. Nevertheless, some return circuit for the magnetic flux in the magnetostrictive wire is desirable to ensure adequate flux density at the ends of the wire. An extra long magnetostrictive wire substantially overcomes any problem arising from this end effect. Note that the output $E_0$ in the various figures of drawings is not shown as measured across the extreme ends because of the end flux effect. Demagnetization of the magnetostrictive wire of the invention by stray fields, however, is sufficient of a problem to recommend the use of an adjacent permanent magnet as set forth herein, or of a soft magnetic sheath acting as a shield of low permanence to maintain magnetization in the wire.

A simple permanent magnet wire of about the same volume as the magnetostrictive volume of the magnetostrictive element and placed substantially within one diameter of the latter in axial parallel spaced apart relation thereto will serve to maintain magnetization of the magnetostrictive element. A large permanent magnet may be used preferably at the same spacing. Accordingly, though not essential in most cases but nevertheless of great utility, a permanent magnet 16 in simple form is shown spaced from element 10 in Figure 1. Magnets 30 and 31 are likewise associated with element 25 in Figure 5. It is desired, according to the invention, to avoid physical contact of the magnet with the wire in particular in a single ended construction of magnetostrictive device as set forth in Figure 1. Whereas a horseshoe magnet shape of the prior art is placed in physical contact with the magnetostrictive wire to reduce leakage flux, the invention accomplishes a lesser leakage flux by aligning the permanent magnet parallel to the wire throughout its length in close spacing but physically separated therefrom as shown. By this simple expedient, the efficiency of flux linkage is so great that physical contact of the magnet to the ends of the wire is rendered unnecessary.

It will be apparent from the foregoing that the invention also concerns the method of converting mechanical energy to electrical energy wherein one end of a magnetostrictive wire is twisted relative to the other by the application of the mechanical energy in the form of twisting moments about the longitudinal axis of the wire. The induced transient electromotive force $E_0$ is detected by connecting suitable electrical or electronic circuitry to electrical leads 32 and 33 of Figure 1 spaced longitudinally along the magnetostrictive wire 10. In this sense, any output utilizing circuit detects the output $E_0$. An improved method of maintaining a predetermined magnetic flux in a magnetostrictive wire with a permanent magnet has been set forth herein. It will also be apparent that a signal voltage applied to a magnetostrictive system as disclosed, will effect mechanical twisting of the wire responsive to said signal and that the same forms a part of this invention. In both cases, a portion of a magnetic field is confined to a predetermined flux path of effectively tubular form having a longitudinal axis. A conductor is supported axially of the flux path so that a signal voltage applied to the conductor induces a twisting of the flux path responsive thereto or a twisting of the flux path by mechanical energy induces a transient electric current in the conductor which may be detected and fed to a utilizing electrical circuit.

What I claim as my invention is:

1. A magnetostrictive device comprising, in combination: a magnetostrictive rod of substantially uniform cross-section; means restraining one end only of said rod against twisting about the longitudinal axis thereof, the other end of said rod being substantially free to twist under action of an external force; an electrical lead connecting to each end of said rod; and a permanent magnet disposed in close parallel spaced relation to said rod uniformly throughout its length but entirely physically separated therefrom to maintain the magnetism of the latter under the influence of stray magnetic fields, said magnet being of an effective volume substantially conforming to the volume of said rod and spaced from the latter a distance less than substantially the effective diameter thereof.

2. A magnetostrictive device comprising, in combination: a magnetostrictive rod of substantially uniform cross-section; anchorage means restraining one end only of said rod against twisting about the longitudinal axis thereof, the other end of said rod being substantially free to twist under action of an external force; an electrical lead connecting to each end of said rod; a longitudinally extending core portion in said rod of higher electrical conductivity than the remainder thereof; and means for supporting the free end of said rod during twisting thereof.

3. A magnetostrictive device comprising, in combination: a magnetostrictive rod of substantially uniform cross-section; anchorage means restraining one end only of said rod against twisting about the longitudinal axis thereof, the other end of said rod being substantially free to twist under action of an external force; an electrical lead connecting to each end of said rod; a longitudinally extending core portion in said rod of higher electrical conductivity than the remainder thereof; a permanent magnet disposed in close parallel spaced relation uniformly throughout its length to said rod but entirely physically separated therefrom; and means for supporting the free end of said rod during twisting thereof.

4. A magnetostrictive device comprising, in combination: a magnetostrictive rod of substantially uniform cross-section; anchorage means restraining one end only of said rod against twisting about the longitudinal axis thereof, the other end of said rod being substantially free to twist under action of an external force; an electrical lead for each end of said rod; a longitudinally extending core portion in said rod of higher electrical conductivity than the remainder thereof; and a permanent magnet of an effective volume substantially conforming to the volume of said rod and spaced uniformly throughout its length in substantially close parallel spaced relationship to said rod.

5. A magnetostrictive device comprising, in combination: a tubular outer shell of a magnetostrictive material of predetermined electrical conductivity; a core for said shell of greater electrical conductivity than said magnetostrictive material and extending axially through said shell; means for making an electrical connection to each end of said core; anchorage means restraining one end only of said tubular shell against twisting about the longitudinal axis thereof, the other end of said shell being substantially free to twist under the action of an external force; and means for supporting the free end of said shell during twisting thereof.

6. A magnetostrictive device comprising, in combination: a tubular outer shell of a magnetostrictive material of predetermined electrical conductivity; a core for said shell of greater electrical conductivity than said magnetostrictive material and extending axially through said shell; means for making an electrical connection to each end of said core; anchorage means restraining one end only of said tubular shell against twisting about the longitudinal axis thereof, the other end of said shell being substantially free to twist under the action of an external force; and means for supporting the free end of said shell during twisting thereof, the diameter of said core being between about 40% and about 90% of the outer diameter of said tubular shell.

7. A magnetostrictive device comprising, in combination: a tubular outer shell of a magnetostrictive metal alloy having resident magnetism and of predetermined electrical conductivity; a core for said shell of greater electrical conductivity than said magnetostrictive material and extending axially through said shell; means for making an electrical connection to each end of said core; anchorage means restraining one end only of said tubular shell against twisting about the longitudinal axis thereof, the other end of said shell being substantially free to twist under the action of an external force; and means for supporting the free end of said shell during twisting thereof.

8. A magnetostrictive device comprising, in combination: a tubular outer shell of a magnetostrictive material of predetermined electrical conductivity; a core for said shell of greater electrical conductivity than said magnetostrictive material and extending axially through said shell; means for making an electrical connection to each end of said core; anchorage means restraining one end only of said tubular shell against twisting about the longitudinal axis thereof, the other end of said shell being substantially free to twist under the action of an external force; and means for supporting the free end of said shell during twisting thereof, said magnetostrictive material being a highly magnetized magnetostrictive metal alloy of high electrical resistance as compared with the material of said core.

References Cited in the file of this patent

UNITED STATES PATENTS

| 2,044,807 | Noyes | June 23, 1936 |
| 2,619,604 | Burns | Nov. 25, 1952 |

OTHER REFERENCES

"Glossary of Physics," by Le Roy D. Weld, 1st edition, 2d impression, 1937, pp. 142 and 252, McGraw-Hill Book Co., New York.